US008860781B2

(12) United States Patent
Nagaraj et al.

(10) Patent No.: US 8,860,781 B2
(45) Date of Patent: Oct. 14, 2014

(54) TEXTURE COMPRESSION IN A VIDEO DECODER FOR EFFICIENT 2D-3D RENDERING

(75) Inventors: Raghavendra C. Nagaraj, San Diego, CA (US); Stephen A. Molloy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 690 days.

(21) Appl. No.: 12/494,839

(22) Filed: Jun. 30, 2009

(65) Prior Publication Data
US 2010/0328425 A1 Dec. 30, 2010

(51) Int. Cl.
H04N 7/26 (2006.01)
H04N 19/44 (2014.01)
H04N 19/27 (2014.01)
G06F 9/445 (2006.01)
G06T 9/00 (2006.01)

(52) U.S. Cl.
CPC ... H04N 19/00412 (2013.01); H04N 19/00533 (2013.01); G06F 9/44521 (2013.01); G06T 9/001 (2013.01)
USPC .......................................................... 348/42

(58) Field of Classification Search
CPC ....................................................... G06T 9/001
USPC .......................................................... 348/42
See application file for complete search history.

(56) References Cited

U.S. PATENT DOCUMENTS

| 5,480,584 | A | | 1/1996 | Urano et al. |
| 5,539,908 | A | * | 7/1996 | Chen et al. ..................... 719/331 |
| 5,822,465 | A | * | 10/1998 | Normile et al. ................ 382/253 |
| 6,271,827 | B1 | * | 8/2001 | Matsumoto .................... 345/601 |
| 6,421,714 | B1 | | 7/2002 | Rai et al. |
| 6,441,754 | B1 | | 8/2002 | Wang et al. |
| 6,477,201 | B1 | | 11/2002 | Wine et al. |
| 6,518,974 | B2 | * | 2/2003 | Taylor et al. ................... 345/582 |
| 6,538,658 | B1 | * | 3/2003 | Herrera .......................... 345/582 |
| 6,798,420 | B1 | | 9/2004 | Xie |
| 7,190,284 | B1 | * | 3/2007 | Dye et al. ......................... 341/51 |
| 7,295,249 | B2 | | 11/2007 | Holland |
| 7,414,632 | B1 | * | 8/2008 | Piazza et al. ................... 345/592 |

(Continued)

FOREIGN PATENT DOCUMENTS

| CN | 1173784 A | 2/1998 |
| CN | 1372759 A | 10/2002 |

(Continued)

OTHER PUBLICATIONS

International Search Report and Written Opinion—PCT/US2010/040480, International Search Authority—European Patent Office—Jan. 4, 2011.

(Continued)

Primary Examiner — William C Vaughn, Jr.
Assistant Examiner — Luis M Perez
(74) Attorney, Agent, or Firm — Steven Thiel; Elaine H. Lo

(57) ABSTRACT

In a video decoding system, a method and system for decoding previously encoded frames of video into a compressed and uncompressed format. The uncompressed format frames may be further stored and utilized to decode additional frames of video. The compressed format frames may be further stored and provided to a display processor to be rendered with additional textures.

11 Claims, 5 Drawing Sheets

(56) References Cited

U.S. PATENT DOCUMENTS

| | | | |
|---|---|---|---|
| 7,418,606 B2 * | 8/2008 | Holmer | 713/320 |
| 7,889,233 B2 | 2/2011 | Mead et al. | |
| 8,013,862 B2 * | 9/2011 | Mathe | 345/582 |
| 8,203,564 B2 | 6/2012 | Jiao et al. | |
| 8,269,781 B2 * | 9/2012 | Pau et al. | 345/503 |
| 2003/0234795 A1 | 12/2003 | Lee | |
| 2004/0008198 A1 * | 1/2004 | Gildred | 345/419 |
| 2005/0062755 A1 | 3/2005 | Van Dyke et al. | |
| 2005/0270304 A1 | 12/2005 | Obinata | |
| 2007/0070083 A1 * | 3/2007 | Fouladi et al. | 345/604 |
| 2007/0092004 A1 | 4/2007 | Ho | |
| 2008/0159708 A1 * | 7/2008 | Kazama et al. | 386/69 |

FOREIGN PATENT DOCUMENTS

| | | |
|---|---|---|
| CN | 101001371 A | 7/2007 |
| CN | 100461866 C | 2/2009 |
| EP | 0814615 A2 | 12/1997 |
| EP | 2088782 A1 | 8/2009 |
| JP | H10066081 | 3/1998 |
| JP | H11122555 A | 4/1999 |
| JP | 2001014489 A | 1/2001 |
| WO | WO03088658 A2 | 10/2003 |
| WO | 2008075027 A2 | 6/2008 |
| WO | 2008101210 A2 | 8/2008 |
| WO | 2008123822 A1 | 10/2008 |

OTHER PUBLICATIONS

Matsumoto M., "3-Dimensional Graphics Strategy of Microsoft", Nikkei CG, Nikkei Business Publications, Inc., Nov. 1996, vol. 122, pp. 189-199.

Ogawa S., "New Architecture 'Talisman' Opening a Gate to 3D Graphics of PC", PC Wave, Kabushiki Kaisha Russell Sha, Nov. 1996, vol. 4(12), pp. 85-87.

Taiwan Search Report—TW099121546—TIPO—Mar. 26, 2013.

* cited by examiner

TEXTURE COMPRESSION IN A VIDEO DECODER FOR EFFICIENT 2D-3D RENDERING

FIELD OF THE INVENTION

The present invention relates to a video decoder configured to output video data in compressed and uncompressed formats.

BACKGROUND

Many of the current day graphical user interfaces (GUIs) involve rendering video as a part of a 3D graphical scene. For example, a video playback device may contain a GUI that utilizes 3D rendered graphics to create a 3D graphical scene. A user may navigate through the GUI to find videos that are stored on the video playback device. As the user navigates through the GUI, the videos may playback as a preview clip within the 3D graphical scene.

In order to display the video within the 3D GUI, the frames of video are first decoded, then a video processor renders a 3D scene using the decoded video frames. The video processor then outputs the scene to a display.

Currently, video decoders decode video in a single uncompressed format such as the YUV 4:2:0 format. The decoded video is output from the video decoder and into the display processor. The display processor may overlay 2D images (i.e., textures in the 3D context) and then output a signal to the display where the images are displayed. In some cases, the display processor converts the video from the YUV 4:2:0 format to the RGB 8:8:8 format before overlaying textures and rendering the video for display on the display device.

However, in order to render video in a 3D graphical scene, the above model is inefficient. As stated above, video is traditionally input into the graphics pipeline of the display processor from the video decoder in the YUV 4:2:0 format, which is uncompressed. The display processor must then convert the video frames to a compressed format and then use the compressed format to render the 3D GUI by overlaying textures. This leads to extra bandwidth required to load uncompressed video textures into the graphics pipeline and extra instruction in the graphics pipeline to convert uncompressed textures into compressed textures.

Previous solutions to reducing the bandwidth and instructions required in the graphics pipeline have included generating a second copy of the video offline in a compressed format that would not require conversion by the display processor. Such solutions, however, do not allow for on-the-fly display of videos in the video display device such as from a source sending live content to the video display device in an uncompressed format. Further, extra external processing and memory is required to store the additional formats of the video.

DETAILED DESCRIPTION

The following detailed description is directed to certain specific embodiments. However, the teachings herein can be applied in a multitude of different ways. In this description, reference is made to the drawings wherein like parts are designated with like numerals throughout.

One embodiment is directed to a video decoder designed to output decoded video in formats suitable for both 2D and 3D graphics rendering. By decoding a video into both an uncompressed and compressed format, it is possible to send video frames to a display processor, which in one embodiment may comprise a 2D and 3D graphics processor, in the right format for reducing the processing required by the display processor to incorporate a video in a rendered 3D graphical user interface (GUI).

Figure 1:
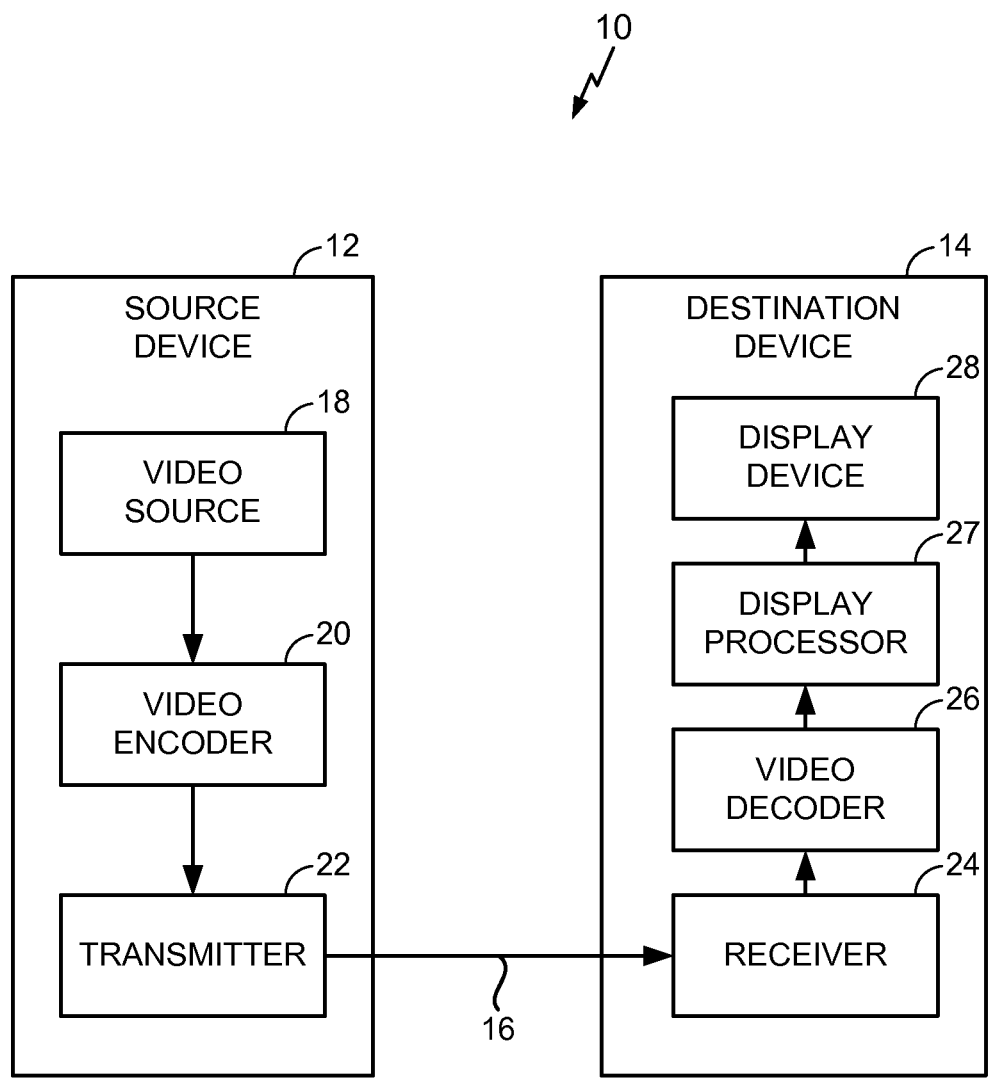
FIG. 1 is a block diagram illustrating a source device and destination device for encoding and decoding of a video signal.

FIG. 1 is a block diagram illustrating an embodiment of a video encoding and decoding system 10 that performs coding techniques as described in this disclosure. As shown in FIG. 1, system 10 includes a source device 12 that transmits encoded video data to a destination device 14 via a communication channel 16. Source device 12 may include a video source 18, a video encoder 20, and a transmitter 22. Video source 18 of source device 12 may include a video capture device, such as a video camera, a video archive containing previously captured video, or a video feed from a video content provider. As a further alternative, video source 18 may generate computer graphics-based data as the source video, or a combination of live video and computer-generated video. In some cases, source device 12 may be a wireless phone or video phone, in which case video source 18 may be a video camera on the phone. In each case, the captured, pre-captured, or computer-generated video may be encoded by video encoder 20 for transmission from source device 12 to destination device 14 via transmitter 22 and communication channel 16.

Video encoder 20 receives video data from video source 18. The video data received from video source 18 may be a series of video frames. Video encoder 20 divides the series of frames into coding units and processes the coding units to encode the series of video frames. The coding units may, for example, be entire frames or portions of the frames (i.e., slices). Thus, in some instances, the frames may be divided into slices. Video encoder 20 divides each coding unit into blocks of pixels (referred to herein as video blocks or blocks) and operates on the video blocks within individual coding units in order to encode the video data. As such, a coding unit (e.g., a frame or slice) may contain multiple video blocks. In other words, a video sequence may include multiple frames, a frame may include multiple slices, and a slice may include multiple video blocks.

The video blocks may have fixed or varying sizes, and may differ in size according to a specified coding standard. As an example, the International Telecommunication Union Standardization Sector (ITU-T) H.264/MPEG-4, Part 10, Advanced Video Coding (AVC) (hereinafter "H.264/MPEG-4 Part 10 AVC" standard) supports intra prediction in various block sizes, such as 16×16, 8×8, or 4×4 pixels for luma components, and 8×8 pixels for chroma components. Inter prediction can be performed in various block sizes, such as 16×16, 16×8, 8×16, 8×8, 8×4, 4×8 and 4×4 pixels for luma components and corresponding scaled sizes for chroma components. In H.264, for example, each video block of 16 by 16 pixels, often referred to as a macroblock (MB), may be subdivided into sub-blocks of smaller sizes and intra or inter predicted in sub-blocks. In general, MBs and the various sub-blocks may be considered to be video blocks. Thus, MBs may be considered to be video blocks, and if partitioned or sub-partitioned, MBs can themselves be considered to define sets of video blocks.

For each of the video blocks, video encoder 20 selects a block type for the block. The block type may indicate whether the block is predicted using inter-prediction or intra-prediction as well as a partition size of the block. For example, the H.264/MPEG-4 Part 10 AVC standard supports a number of inter- and intra-prediction block types including Inter 16×16, Inter 16×8, Inter 8×16, Inter 8×8, Inter 8×4, Inter 4×4, Intra 16×16, Intra 8×8, and Intra 4×4. As described in detail below, video encoder 20 may select one of the block types for each of the video blocks to be encoded.

Video encoder 20 also selects a prediction mode for each of the video blocks. In the case of an intra-coded video block, the prediction mode may determine the manner in which to predict the current video block using one or more previously encoded video blocks. In the H.264/MPEG-4 Part 10 AVC standard, for example, video encoder 20 may select one of nine possible unidirectional prediction modes for each Intra 4×4 block; a vertical prediction mode, horizontal prediction mode, DC prediction mode, diagonal down/left prediction mode, diagonal down/right prediction mode, vertical-right prediction mode, horizontal-down predication mode, vertical-left prediction mode and horizontal-up prediction mode. Similar prediction modes are used to predict each Intra 8×8 block. For an Intra 16×16 block, video encoder 20 may select one of four possible unidirectional modes; a vertical prediction mode, a horizontal prediction mode, a DC prediction mode, and a plane prediction mode. In some instances, video encoder 20 may select the prediction mode from a set of prediction modes that includes not only unidirectional prediction modes, but also one or more multi-directional prediction modes that define combinations of the unidirectional modes. For example, the one or more multi-directional prediction modes may be bidirectional prediction modes that combine two unidirectional prediction modes as described in further detail below.

After selecting the prediction mode for the video block, video encoder 20 generates a predicted video block using the selected prediction mode. The predicted video block is subtracted from the original video block to form a residual block. The residual block includes a set of pixel difference values that quantify differences between pixel values of the original video block and pixel values of the generated prediction block. The residual block may be represented in a two-dimensional block format (e.g., a two-dimensional matrix or array of pixel difference values).

Following generation of the residual block, video encoder 20 may perform a number of other operations on the residual block before encoding the block. Video encoder 20 may apply a transform, such as an integer transform, a DCT transform, a directional transform, or a wavelet transform to the residual block of pixel values to produce a block of transform coefficients. The transform coefficients may be a frequency-domain representation of the residual block. Thus, video encoder 20 converts the residual pixel values to transform coefficients (also referred to as residual transform coefficients). The residual transform coefficients may be referred to as a transform block or coefficient block. The residual transform coefficients may be a one-dimensional representation of the coefficients when non-separable transforms are applied or a two-dimensional representation of the coefficients when separable transforms are applied. Non-separable transforms may include non-separable directional transforms. Separable transforms may include separable directional transforms, DCT transforms, integer transforms, and wavelet transforms.

Following transformation, video encoder 20 performs quantization to generate quantized transform coefficients (also referred to as quantized coefficients or quantized residual coefficients). Again, the quantized coefficients may be represented in one-dimensional vector format or two-dimensional block format. Quantization generally refers to a process in which coefficients are quantized to possibly reduce the amount of data used to represent the coefficients. The quantization process may reduce the bit depth associated with some or all of the coefficients. As used herein, the term "coefficients" may represent transform coefficients, quantized coefficients or other type of coefficients. The techniques of this disclosure may, in some instances, be applied to residual pixel values as well as transform coefficients and quantized transform coefficients.

When separable transforms are used and the coefficient blocks are represented in a two-dimensional block format, video encoder 20 scans the coefficients from the two-dimensional format to a one-dimensional format. In other words, video encoder 20 may scan the coefficients from the two-dimensional block to serialize the coefficients into a one-dimensional vector of coefficients. In accordance with one of the aspects of this disclosure, video encoder 20 may adjust the scan order used to convert the coefficient block to one dimension based on collected statistics. The statistics may comprise an indication of the likelihood that a given coefficient value in each position of the two-dimensional block is zero or non-zero and may, for example, comprise a count, a probability or other statistical metric associated with each of the coefficient positions of the two-dimensional block. In some instances, statistics may only be collected for a subset of the coefficient positions of the block. When the scan order is evaluated, e.g., after a particular number of blocks, the scan order may be changed such that coefficient positions within the block determined to have a higher probability of having non-zero coefficients are scanned prior to coefficient positions within the block determined to have a lower probability of having non-zero coefficients. In this way, an initial scanning order may be adapted to more efficiently group non-zero coefficients at the beginning of the one-dimensional coefficient vector and zero valued coefficients at the end of the one-dimensional coefficient vector. This may in turn reduce the number of bits spent on entropy coding since there are shorter runs of zeros between non-zeros coefficients at the beginning of the one-dimensional coefficient vector and one longer run of zeros at the end of the one-dimensional coefficient vector.

Following the scanning of the coefficients, video encoder 20 encodes each of the video blocks of the coding unit using any of a variety of entropy coding methodologies, such as context adaptive variable length coding (CAVLC), context adaptive binary arithmetic coding (CABAC), run length coding or the like. Source device 12 transmits the encoded video data to destination device 14 via transmitter 22 and channel 16. Communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting encoded video data from source device 12 to destination device 14.

Destination device 14 may include a receiver 24, video decoder 26, display processor 27, and display device 28. Receiver 24, which is one means of receiving a video signal, receives the encoded video bitstream from source device 12 via channel 16. Video decoder 26 applies entropy decoding to decode the encoded video bitstream to obtain header information, motion vectors, and quantized residual coefficients of the coded video blocks of the coded unit. As described above, the quantized residual coefficients encoded by source device 12 are encoded as a one-dimensional vector. Video decoder 26 therefore scans the quantized residual coefficients of the coded video blocks to convert the one-dimensional vector of coefficients into a two-dimensional block of quantized residual coefficients. Like video encoder 20, video decoder 26 may collect statistics that indicate the likelihood that a given coefficient position in the video block is zero or non-zero and thereby adjust the scan order in the same manner that was used in the encoding process. Accordingly, reciprocal adaptive scan orders can be applied by video decoder 26 in order to change the one-dimensional vector representation of the serialized quantized transform coefficients back to two-dimensional blocks of quantized transform coefficients.

Video decoder 26 reconstructs each of the blocks of the coding unit using the decoded header information and the decoded residual information. In particular, video decoder 26 may generate a prediction video block for the current video block and combine the prediction block with a corresponding residual video block to reconstruct each of the video blocks. It should be noted that in some embodiments the prediction block generated by the video decoder 26 and video encoder 20 are identical. Hence by combining the residual transmitted in the encoded video bitstream with the prediction block, video decoder 26 generates a reconstructed block identical to that generated at video encoder 20. Video decoder 26 may then store the combined video blocks that make up a frame of video. Video decoder 26 may output the decoded video in a YUV format and/or in other formats described in the embodiments below. The decoded video is then sent to display processor 27, which overlays textures and renders the textures and video for display on display device 28. In some embodiments, display processor 27 may have limited 2D graphics functionality (e.g., the ability to perform simple 2D overlay and blending). In other embodiment, display processor 27 may comprise a 2D and 3D graphics processor, and may perform more complicated geometric transformations. Destination device 14 may display the reconstructed video blocks as part of a rendered scene to a user via display device 28. Display device 28 may comprise any of a variety of display devices such as a cathode ray tube (CRT), a liquid crystal display (LCD), a plasma display, a light emitting diode (LED) display, an organic LED display, or another type of display unit.

In some cases, source device 12 and destination device 14 may operate in a substantially symmetrical manner. For example, source device 12 and destination device 14 may each include video encoding and decoding components. Hence, system 10 may support one-way or two-way video transmission between devices 12, 14, e.g., for video streaming, video broadcasting, or video telephony. A device that includes video encoding and decoding components may also form part of a common encoding, archival and playback device such as a digital video recorder (DVR).

Video encoder 20 and video decoder 26 may operate according to any of a variety of video compression standards, such as such as those defined by the Moving Picture Experts Group (MPEG) in MPEG-1, MPEG-2 and MPEG-4, the ITU-T H.263 standard, the Society of Motion Picture and Television Engineers (SMPTE) 421M video CODEC standard (commonly referred to as "VC-1"), the standard defined by the Audio Video Coding Standard Workgroup of China (commonly referred to as "AVS"), as well as any other video coding standard defined by a standards body or developed by an organization as a proprietary standard. Although not shown in FIG. 1, in some aspects, video encoder 20 and video decoder 26 may each be integrated with an audio encoder and decoder, respectively, and may include appropriate MUX-DEMUX units, or other hardware and software, to handle encoding of both audio and video in a common data stream or separate data streams. In this manner, source device 12 and destination device 14 may operate on multimedia data. If applicable, the MUX-DEMUX units may conform to the ITU H.223 multiplexer protocol, or other protocols such as the user datagram protocol (UDP).

In some aspects, for video broadcasting, the techniques described in this disclosure may be applied to enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published in July 2007 as Technical Standard TIA-1099 (the "FLO Specification"). That is to say, communication channel 16 may comprise a wireless information channel used to broadcast wireless video information according to the FLO Specification, or the like. The FLO Specification includes examples defining bitstream syntax and semantics and decoding processes suitable for the FLO Air Interface.

Alternatively, video may be broadcasted according to other standards such as DVB-H (digital video broadcast-handheld), ISDB-T (integrated services digital broadcast—terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple destination devices, each of which may be similar to destination device 14 of FIG. 1. Thus, although a single destination device 14 is shown in FIG. 1, for video broadcasting applications, source device 12 would typically broadcast the video content simultaneously to many destination devices.

In other examples, transmitter 22, communication channel 16, and receiver 24 may be configured for communication according to any wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM (Global System for Mobile Communication), GPRS (General packet Radio Service), or EDGE (enhanced data GSM environment), a TETRA (Terrestrial Trunked Radio) mobile telephone system, a wideband code division multiple access (WCDMA) system, a high data rate 1xEV-DO (First generation Evolution Data Only) or 1xEV-DO Gold Multicast system, an IEEE 802.18 system, a MediaFLO™ system, a DMB system, a DVB-H system, or another scheme for data communication between two or more devices.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, source device 12 and destination device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being transmitter 22 of source device 12 and receiver 24 of destination device 14 in FIG. 1.

Figure 5:
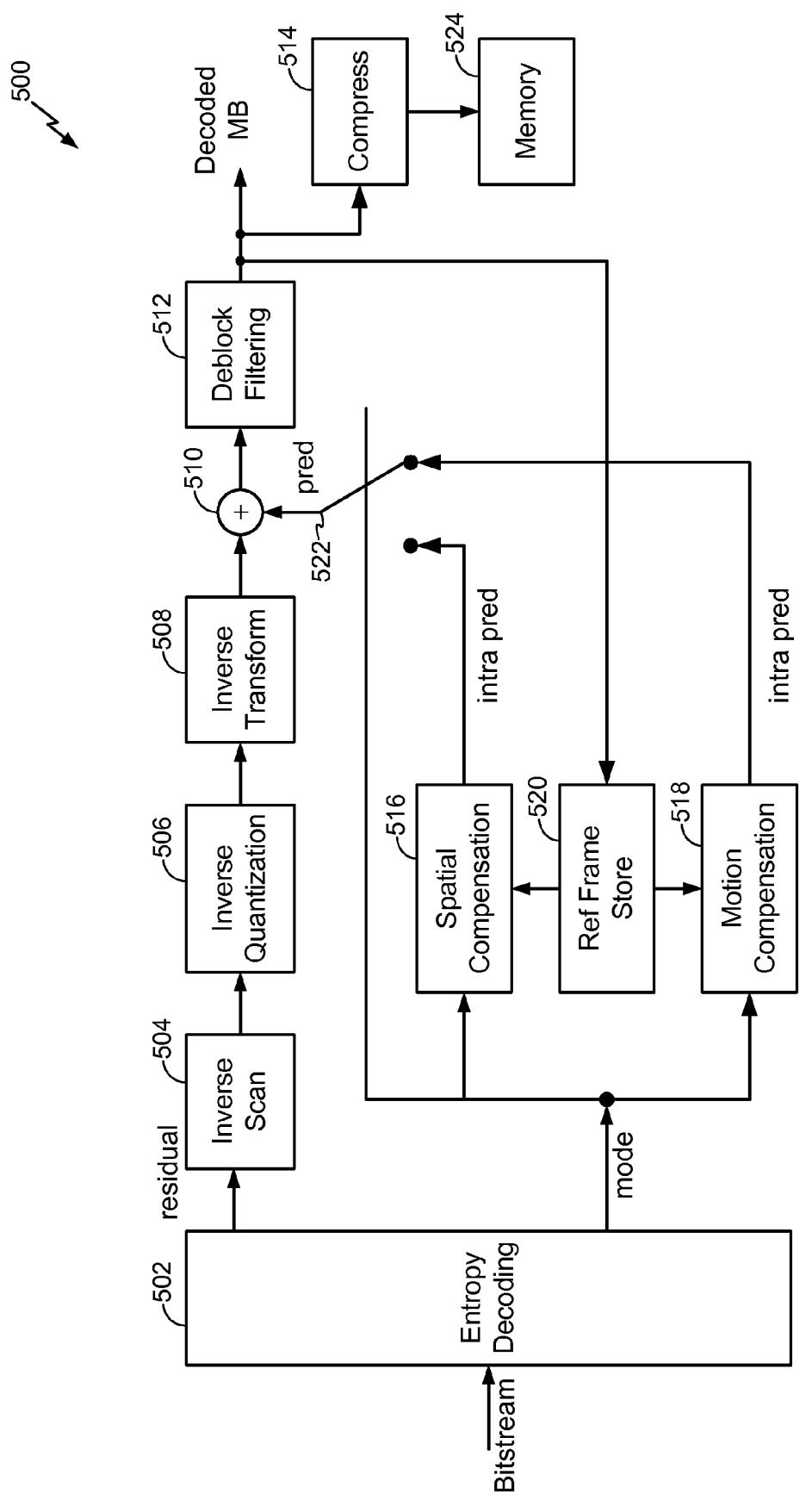
FIG. 5 is a block diagram of an embodiment of a video decoder of FIG. 1.

FIG. 5 is one embodiment of a video decoder 26 configured to output video data in both a compressed and an uncompressed format. The encoded bitstream is fed into the system 500. Portions of the bitstream may correspond to different macroblocks. Further, several of those macroblocks may make up a single video frame. A portion of the bitstream corresponding to a given macroblock is entropy decoded at entropy decoding unit 502 to form the residual block. The residual block is then inverse-scanned at inverse-scanning unit 504, inverse-quantized at inverse-quantizing unit 506, and inverse-transformed at inverse-transforming unit 508. A predictor macroblock is generated and added at adding unit 510.

The predictor macroblock described above can be of two types—Intra and Inter. Spatial compensation unit 516 uses the neighboring macroblocks to generate the intra predictor macroblock. Motion compensation unit 518 uses the previous/future frames stored at reference frame store 520, which may comprise a memory, to generate the inter predictor macroblock. Switch 522 can be switched to send either the intra or inter predictor macroblock to adding unit 510 to generate the output signal.

The resulting reconstructed macroblock is then sent to deblock filtering unit 512 where it is filtered. For example, macroblock edges may be filtered to prevent blocking artifacts that may be visually unappealing. The output generated is a set of raw pixels, which is the uncompressed format output (e.g., macroblocks in YUV 4:2:0 format or YUV 4:2:2 format). In one embodiment, the uncompressed output may be a block of size 16×16. The uncompressed output may be stored for reconstruction of other video frames. Modification of the uncompressed output may result in visual artifacts in later reconstructed frames. The raw pixel output is sent to compressing unit 514 where the raw pixel output is converted to a compressed format output suitable for use in a graphics pipeline. In one embodiment, the compressed output may be in block units of size 4×4. The raw pixel output is also sent to and stored in reference frame store 520, which may be used to generate the predictor macroblock. In one embodiment, compressing unit 514 performs the steps of process 300, described below, to generate the compressed format output. The output from compressing unit 514, which corresponds to a decoded compressed macroblock, is stored in a memory 524. As the bitstream is decoded, multiple decoded compressed macroblocks are stored in memory 524. When all of the macroblocks corresponding to a given video frame have been stored in memory 524, memory 524 contains a compressed video frame. In some embodiments, the compressed video frame is then read into a 3D graphics pipeline of display processor 27 for rendering as part of a 3D GUI or scene, which is described below.

Figure 2:
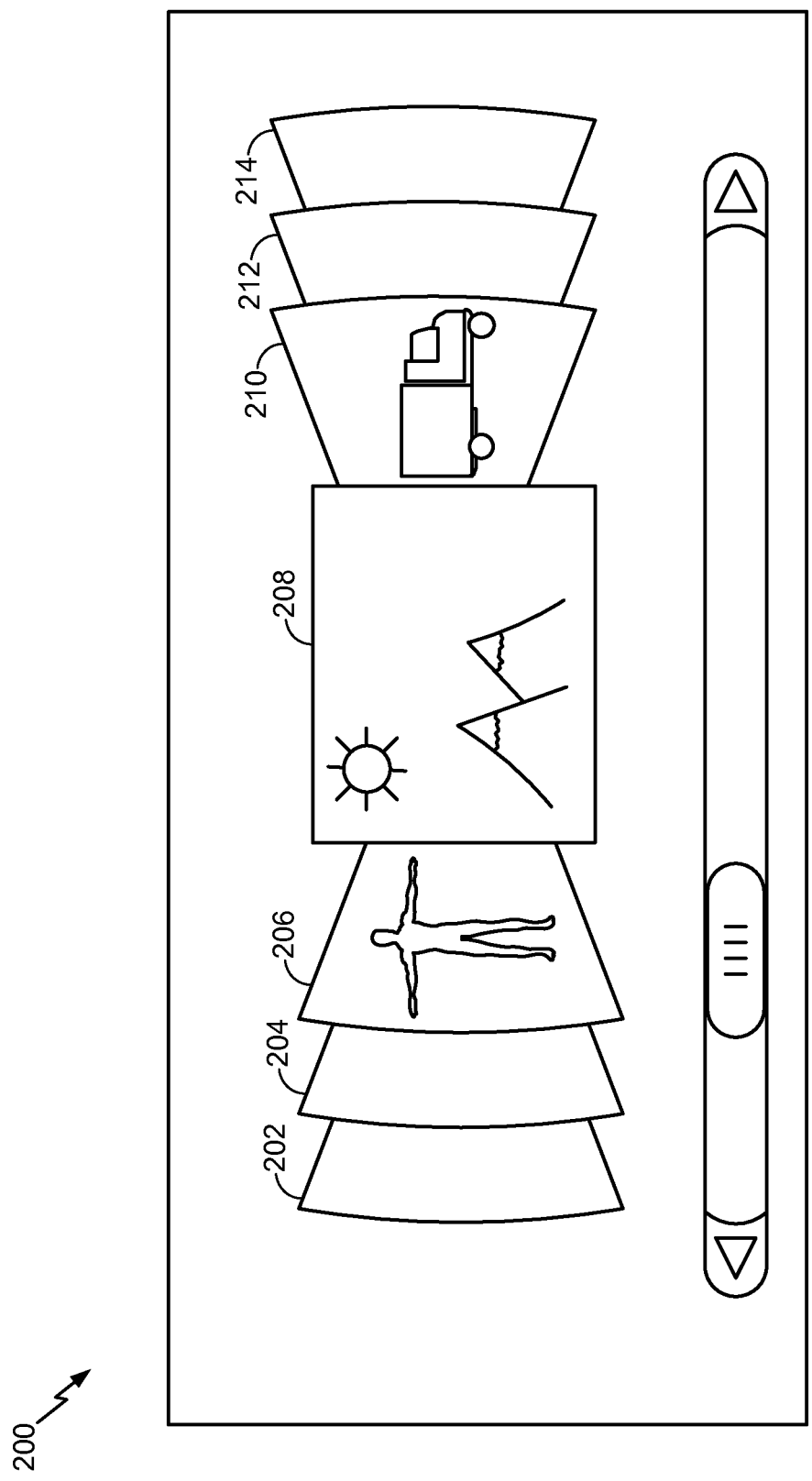
FIG. 2 is an embodiment of a rendered 3D scene with decoded video incorporated therein.

FIG. 2 is one embodiment of a snapshot of a rendered 3D GUI 200 of the disclosure. In this embodiment, each of the videos 202-216 or any subset of the videos 202-216 may be playing within the GUI. Further, each video may be moved with respect to a 2D or 3D plane within the GUI, such that the video changes perspective and location within the scene, while the video continues to play.

In one embodiment, display processor 27 supports processing of a 3D graphics pipeline capable of generating a 3D GUI or scene. A 3D graphics pipeline may comprise software or firmware for converting 3D scenes into 2D raster images. A 3D graphics pipeline comprises a series of stages, wherein data (e.g. scene description data such as geometry, lighting, etc.) and images used to generate a 3D image (e.g., textures in the 3D context) are input at the beginning of the pipeline and a 2D raster image is output at the end of the pipeline. The input is processed at each stage of the graphics pipeline. Once processing at a given stage is complete, the input moves to the next stage, until it reaches the end of the graphics pipeline. In one embodiment, the 3D graphics pipeline comprises a modeling transformation stage, a per-vertex lighting stage, a viewing transformation stage, a projection transformation stage, a clipping stage, a rasterization stage, a texturing stage, and a display stage. The display processor 27 may be thought of as the physical incarnation of the 3D graphics pipeline. In this embodiment, display processor 27 processes the input at each stage.

As discussed with regards to FIG. 5, video decoder 26 takes in a bitstream corresponding to a video frame. Video decoder 26 then decodes the bitstream into a compressed format (e.g., RGB 8:8:8) and stores compressed video frames to be used in the 3D graphics pipeline. The video frame moves from storage to the 3D graphics pipeline. In other embodiments, the compressed format of data is sent directly to the 3D graphics pipeline. Textures are overlayed and a 3D scene is rendered without requiring extra stages in the pipeline to convert the video to a format that is capable of being rendered in a 3D scene. As discussed above the display processor 27 is a physical incarnation of the 3D graphics pipeline and overlays the textures and generates the 3D scene. The display processor 27 then rasterizes the 3D scene (i.e., converts it into a 2D set of pixels) for display on display device 28. In some embodiments, display processor 27 may receive video frames in a compressed format and/or an uncompressed format from video decoder 26. Display processor 27 may then render either the compressed format or uncompressed format for display on display device 28.

In one embodiment video decoder 26 is configured to output data in a format that corresponds to the format used by display processor 27 to compress textures and render a 3D scene using those textures. Different embodiments of display processor 27 may utilize one or more different texture compression schemes. Texture compression schemes reduce the bandwidth associated with loading textures in the graphics pipeline to make a scene. One example is the compression from a 24-bit graphic in RGB 8:8:8 format to a 4-bit graphic. Some examples of texture compression formats are DXT, ATI, and ETC1. These compression techniques utilize Block Truncation Coding (BTC). In BTC, a frame of video is divided into non-overlapping blocks. Each of these blocks are then compressed at a fixed compression ratio. One aspect that varies between the various compression formats is the amount of distortion they introduce for different block characteristics.

Figure 3:
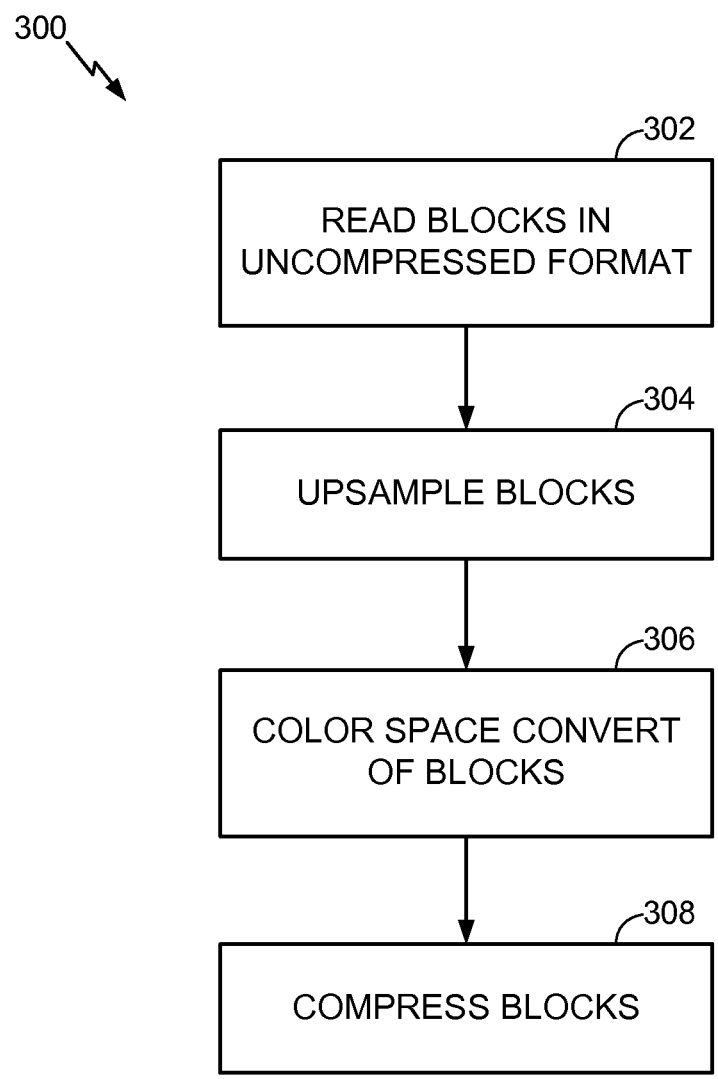
FIG. 3 is a flowchart of an embodiment of a process for compressing frames of video.

FIG. 3 is one embodiment of a process 300 for texture compression. At step 302, blocks from the video frame are read from memory in an uncompressed format. At a next 304, the blocks are upsampled. Further, at a step 306, the color space of the blocks are converted from YCbCr to RGB. At a next step 308, the blocks are compressed to one of the texture compression formats. The steps of process 300 are performed by the video decoder 26, and the resulting compressed video frame is sent to the 3D graphics pipeline.

Figure 4:
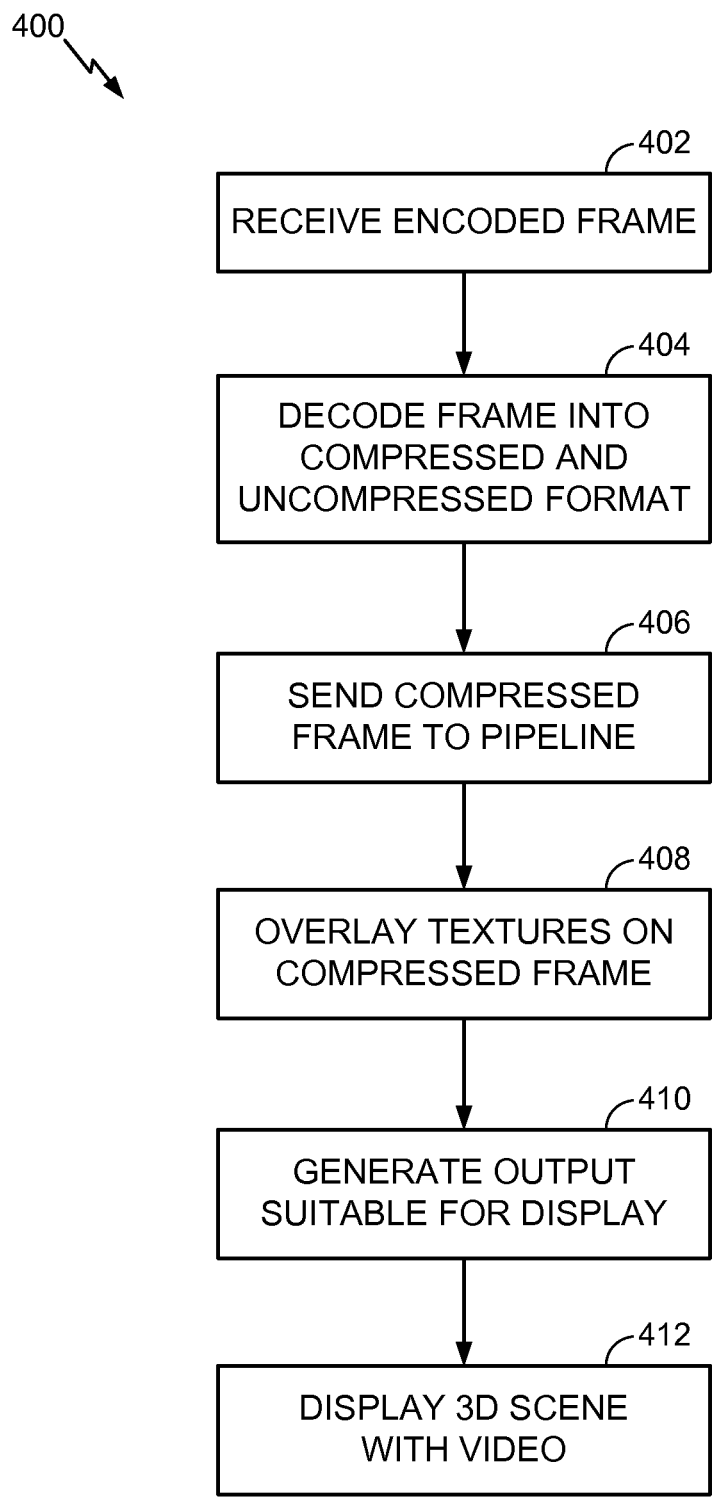
FIG. 4 is a flowchart of a process of rendering a scene using video decoded by the process of FIG. 3.

FIG. 4 is one embodiment of a process 400 of receiving encoded video frames and generating a 3D scene embedded with the video for display on display device 28. At step 402, video decoder 26 receives an encoded frame of video. Next, at a step 404, the video decoder decodes the video frame into an uncompressed and a compressed format. In one alternative embodiment of step 404, the video decoder also downsamples the video frame as described later in the specification. In some embodiments, video decoder 26 stores both the decoded compressed and decoded uncompressed formats of the video concurrently (i.e., simultaneously or at about the same time). In one embodiment, the compressed format of the video frame is generated according to process 300. Continuing, at a step 406, the compressed video frame is sent to the graphics pipeline. At a next step 408, the display processor 27 overlays textures and generates a 3D scene incorporating the compressed video frame as a texture within the 3D scene. At a further step 410, display processor 27 generates an output suitable for display on a 2D display device 28 based on the 3D scene created at step 408. At a next step 412, the output generated at step 410 is displayed on display device 28.

In some embodiments, video rendered through display processor 27 may undergo non-linear geometric transformations. In such embodiments, different portions of the video frame may be sub-sampled to different degrees. Such subsampling may lead to undesirable visual artifacts such as jagged edges. In some embodiments, display processor 27 may include anti-aliasing filtering mechanisms to mitigate the aliasing artifacts. In other embodiments, video decoder 26 may include an anti-aliasing filter and/or may be configured to perform various anti-aliasing techniques. These embodiments may be configured to operate on non-uniformly subsampled frames of video.

It should be noted that during the video rendering process, the video may be rendered at a different resolution than at which it was decoded, a process called downsampling. A downsampler may interact with the video decoder to created secondary outputs from the video decoder (e.g. downsampled and compressed video, down-sampled and uncompressed video, and non-downsampled and compressed video). Accordingly, the memory space required to store each frame of video may be further reduced by downsampling the video frame.

Further, it should be noted that though the disclosure discusses inserting a single video within a 3D scene, one of ordinary skill in the art will recognize that the system can also be configured to render a 3D scene incorporating multiple videos.

The techniques described in this disclosure may be implemented in hardware, software, firmware, or any combination thereof. Any features described as units or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software units or hardware units configured for encoding and decoding, or incorporated in a combined video encoder-decoder (CODEC). Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various embodiments of this disclosure have been described. These and other embodiments are within the scope of the following claims.

What is claimed is:

1. A video decoding system comprising:
    a decoder configured to receive encoded video data and decode the encoded video data as raw pixel data in an uncompressed YUV format;
    an upsampling unit configured to upsample the raw pixel data;
    a converting unit configured to convert the upsampled raw pixel data into RGB pixel data;
    a compression unit configured to compress the RGB pixel data into a compressed texture format of data, wherein the compressed texture format is one of a Direct X texture (DXT), ATI, or Ericsson Texture Compression 1 (ETC1) format;
    a memory configured to store the raw pixel data in the uncompressed YUV format of data; and
    a display processor configured to receive the compressed texture format of data, construct a 3D scene utilizing the compressed texture format of data and output data representative of the 3D scene;
    receive the uncompressed YUV format of data from the memory, and render the uncompressed YUV format of data for display,
    wherein the display processor outputs an image to a display device based on both the uncompressed format of data and the data representative of the 3D scene.

2. The video decoding system of claim 1, wherein the uncompressed YUV format is a YUV 4:2:0 format.

3. The video decoding system of claim 1, wherein the uncompressed YUV format is a YUV 4:2:2 format.

4. The video decoding system of claim 1, further comprising a display configured to display the 3D scene.

5. The video decoding system of claim 1, wherein the 3D scene includes one or more videos, wherein each video may be moved with respect to a 2D plane while continuing to play.

6. A method of decoding video, comprising:
receiving, with a decoder, encoded video data;
decoding, with the decoder, the encoded video data into raw pixel data in an uncompressed YUV format;
upsampling, with an upsampling unit, the raw pixel data;
converting, with a converting unit, the upsampled raw pixel data into an RGB format of data;
compressing, with a compression unit, the RGB pixel data into a compressed texture format of data, wherein the compressed texture format is one of a Direct X texture (DXT), ATI, or Ericsson Texture Compression 1 (ETC1) format;
storing the raw pixel data;
rendering the raw pixel data for display;
reading the compressed texture format of data for rendering as part of a 3D scene;
outputting data representative of the 3D scene; and
outputting an image to a display device based on both the rendered raw pixel data and the data representative of the 3D scene.

7. The method of claim 6, wherein the encoded video data is representative of a 2D video scene.

8. The method of claim 6, wherein the uncompressed YUV format is a YUV 4:2:0 format.

9. The method of claim 6, wherein the uncompressed YUV format is a YUV 4:2:2 format.

10. The method of claim 6, wherein the 3D scene includes one or more videos, wherein each video may be moved with respect to a 2D plane while continuing to play.

11. A non-transitory computer-readable medium, comprising instructions that when executed perform a method comprising:
receiving encoded video data;
decoding the encoded video data into raw pixel data in an uncompressed YUV format;
upsampling the raw pixel data;
converting the upsampled raw pixel data into an RGB format of data;
compressing the RGB data into a compressed texture format of data, wherein the compressed texture format is one of a Direct X texture (DXT), ATI, or Ericsson Texture Compression 1 (ETC1) format;
storing the raw pixel data;
rendering the raw pixel data for display;
reading the compressed texture format of data for rendering as part of a 3D scene;
outputting data representative of the 3D scene; and
outputting an image to a display device based on both the rendered raw pixel data and the data representative of the 3D scene.

* * * * *